(12) United States Patent
Schieffelin

(10) Patent No.: US 10,661,854 B1
(45) Date of Patent: May 26, 2020

(54) ELECTRIC BICYCLE WITH INTEGRATED AIR SUPPLY SYSTEM

(71) Applicant: CIVILIZED CYCLES INCORPORATED, Portland, OR (US)

(72) Inventor: Zachary Schieffelin, Portland, OR (US)

(73) Assignee: CIVILIZED CYCLES INCORPORATED, Portland, OR (US)

( * ) Notice: Subject to any disclaimer, the term of this patent is extended or adjusted under 35 U.S.C. 154(b) by 0 days.

(21) Appl. No.: 16/693,747

(22) Filed: Nov. 25, 2019

Related U.S. Application Data

(63) Continuation of application No. 16/550,003, filed on Aug. 23, 2019, now Pat. No. 10,486,767.

(51) Int. Cl.
| | |
|---|---|
| *B62K 25/08* | (2006.01) |
| *B62M 6/80* | (2010.01) |
| *B62J 99/00* | (2020.01) |
| *B62K 25/10* | (2006.01) |
| *B62K 25/04* | (2006.01) |
| *B60G 17/015* | (2006.01) |
| *B60G 17/052* | (2006.01) |
| *B62J 45/00* | (2020.01) |
| *B62J 45/40* | (2020.01) |

(52) U.S. Cl.
CPC ............... *B62K 25/08* (2013.01); *B62J 99/00* (2013.01); *B62K 25/10* (2013.01); *B62M 6/80* (2013.01); *B60G 17/0155* (2013.01); *B60G 17/052* (2013.01); *B60G 2202/152* (2013.01); *B60G 2300/12* (2013.01); *B62J 45/00* (2020.02); *B62J 45/40* (2020.02); *B62K 2025/044* (2013.01); *B62K 2204/00* (2013.01)

(58) Field of Classification Search
CPC ............... B60G 17/0155; B62K 25/08; B62J 2099/004; B62M 6/80
See application file for complete search history.

(56) References Cited

U.S. PATENT DOCUMENTS

| | | | |
|---|---|---|---|
| 4,942,936 A * | 7/1990 | Gardner, Jr. ............. | B62M 6/40 180/206.1 |
| 6,555,928 B1 * | 4/2003 | Mizuno ................... | B60L 58/34 290/40 C |
| 8,469,381 B2 * | 6/2013 | Dodman .................. | B62M 6/55 280/281.1 |
| 9,657,727 B2 * | 5/2017 | Osborn ..................... | E03B 9/20 |
| 2009/0266636 A1 * | 10/2009 | Naegeli ................... | B62M 6/60 180/206.5 |
| 2019/0270358 A1 * | 9/2019 | Korrect .............. | B60G 17/0525 |

FOREIGN PATENT DOCUMENTS

| | | | | |
|---|---|---|---|---|
| CN | 109250019 A * | 1/2019 | | |
| DE | 102011081682 A1 * | 2/2013 | ............. | B62J 11/02 |
| DE | 102013109215 A1 * | 2/2015 | ............ | F04B 33/005 |

* cited by examiner

*Primary Examiner* — Kevin Hurley
(74) *Attorney, Agent, or Firm* — Kolitch Romano LLP

(57) ABSTRACT

A self-adjusting suspension system according to the present disclosure may be incorporated into an electric vehicle design by way of an integrated air supply system. The integrated air supply system measures and adjusts amounts of pressurized air within pneumatic components of the electric vehicle to provide a predetermined desired amount of suspension. The integrated air supply system also may be used to provide air to pneumatic tires of the vehicle, without the need for an external pump.

20 Claims, 8 Drawing Sheets

ELECTRIC BICYCLE WITH INTEGRATED AIR SUPPLY SYSTEM

FIELD

This disclosure relates to systems and methods for providing an integrated air supply to a wheeled vehicle. More specifically, the disclosed embodiments relate to a pneumatic suspension system that includes an integrated air supply system for use with bicycles, scooters, mopeds, motorcycles, and the like.

INTRODUCTION

A suspension system on a wheeled vehicle may comprise one or more shock absorbers strategically placed between a frame and wheels of the vehicle to enable a smoother ride. A pneumatic suspension system is a suspension system wherein the shock absorbers contain pressurized air and are configured to act as an air spring. The level of suspension a wheeled vehicle requires, or that a user desires, is highly dependent on the loading mass of the vehicle, which may often vary between uses. Components of a pneumatic suspension rely on pressurized air and, as such, are prone to leakages and often require maintenance regardless of the quality of their construction. In accordance with aspects of the present invention, an integrated air supply system can perform automatic maintenance on these pneumatic components. In accordance with further aspects of the present invention, an integrated air supply can alternatively, or in addition, perform maintenance on pneumatic tires of the wheeled vehicle.

SUMMARY

The present disclosure provides systems, apparatuses, and methods relating to providing an integrated air supply to a wheeled vehicle.

In some examples, a wheeled vehicle may include pneumatic tires and/or a pneumatic suspension system; and an integrated air supply system coupled to a frame of the wheeled vehicle and/or mounted internal to a storage component of the wheeled vehicle (e.g. within expandable panniers); wherein the integrated air supply system comprises: a battery; an electric air compressor having one or more outlet valves configured to supply pressurized air; one or more air lines configured to attach to the outlet valves of the air compressor at a first end and to selectively attach to valve stems of additional pneumatic components at a second end; wherein the additional pneumatic components include a pneumatic suspension system including a pneumatic front fork and a rear air spring, and pneumatic tires; wherein the valve stems of the pneumatic components comprise release valves configured to open and/or close in response to an electric signal.

In some examples, an integrated air supply system comprises: a battery; a compressor; a front and/or rear air spring; one or more sensors configured to measure an amount of suspension and/or pressure; and a controller configured to be in communication with the one or more sensors; wherein the controller is further configured to determine whether the amount of suspension and/or pressure is too low, too high, or at an optimal level; if the amount of suspension is too low, the controller signals an electric air compressor to power on to supply pressurized air to an appropriate pneumatic component (e.g. a pneumatic front fork and/or a rear air spring); if the amount of suspension is too high, the controller signals a release valve on the appropriate pneumatic component to open, causing air to evacuate from the pneumatic component; if the amount of suspension is at the optimal level, the controller does not make any adjustments to the suspension.

In some examples, a method for automatically leveling a suspension of a wheeled vehicle in response to a load mass change, indicated by a user of the wheeled vehicle, may include: receiving a command initiating a cycling of pneumatic suspension; evacuating the air from a rear air spring; signaling an electric air compressor to power on; and delivering pressurized air from the electric air compressor to the rear air spring via an air line; wherein the airline is configured to attach to an outlet valve of the electric air compressor at a first end and to attach to a valve of the rear air spring at a second end; the electric air compressor is further configured to automatically power off after a predetermined amount of suspension is detected, directly or indirectly, by one or more sensors, or failing the detection of the predetermined amount of suspension, the electric air compressor is to power off after a predetermined amount of time.

In some examples, a method for automatically adjusting pneumatic tire pressure of a wheeled vehicle may include: a user attaching a first end of an air line to an outlet valve of an internal electric air compressor, the user further attaching a second end of the air line to a valve stem of the pneumatic tire, measuring the pneumatic tire pressure, the controller receiving the measured pneumatic tire pressure and comparing it to an optimal pneumatic tire pressure; wherein the controller is further configured to determine an appropriate course of action in response to the comparison of the measured and optimal pneumatic tire pressures. If the measured pneumatic tire pressure is lower than the optimal pressure, the controller signals the electric air compressor to power on to re-fill the pneumatic tire. If the measured pneumatic tire pressure is larger than the optimal pressure, the controller signals a release valve of the valve stem to open to evacuate excess air from the pneumatic tire. If the measured and optimal pneumatic tire pressures equal one another within a small tolerance, the controller may signal the user that the tire is at the optimal pressure.

In some examples, a method for automatically maintaining a user specified feel (e.g. amount of sag) in response to varying riding conditions (e.g. acceleration, incline, and/or tilt) may include: accessing the user's specified data, detecting changes in the riding conditions, computing an optimum pressure level for a suspension component to attain the user specified feel, and increasing or decreasing the amount of pressurized air within the pneumatic components to attain the user specified feel under the current riding conditions (e.g. the same amount of sag in the suspension under different riding conditions).

Features, functions, and advantages may be achieved independently in various embodiments of the present disclosure, or may be combined in yet other embodiments, further details of which can be seen with reference to the following description and drawings.

DETAILED DESCRIPTION

Figure 1:
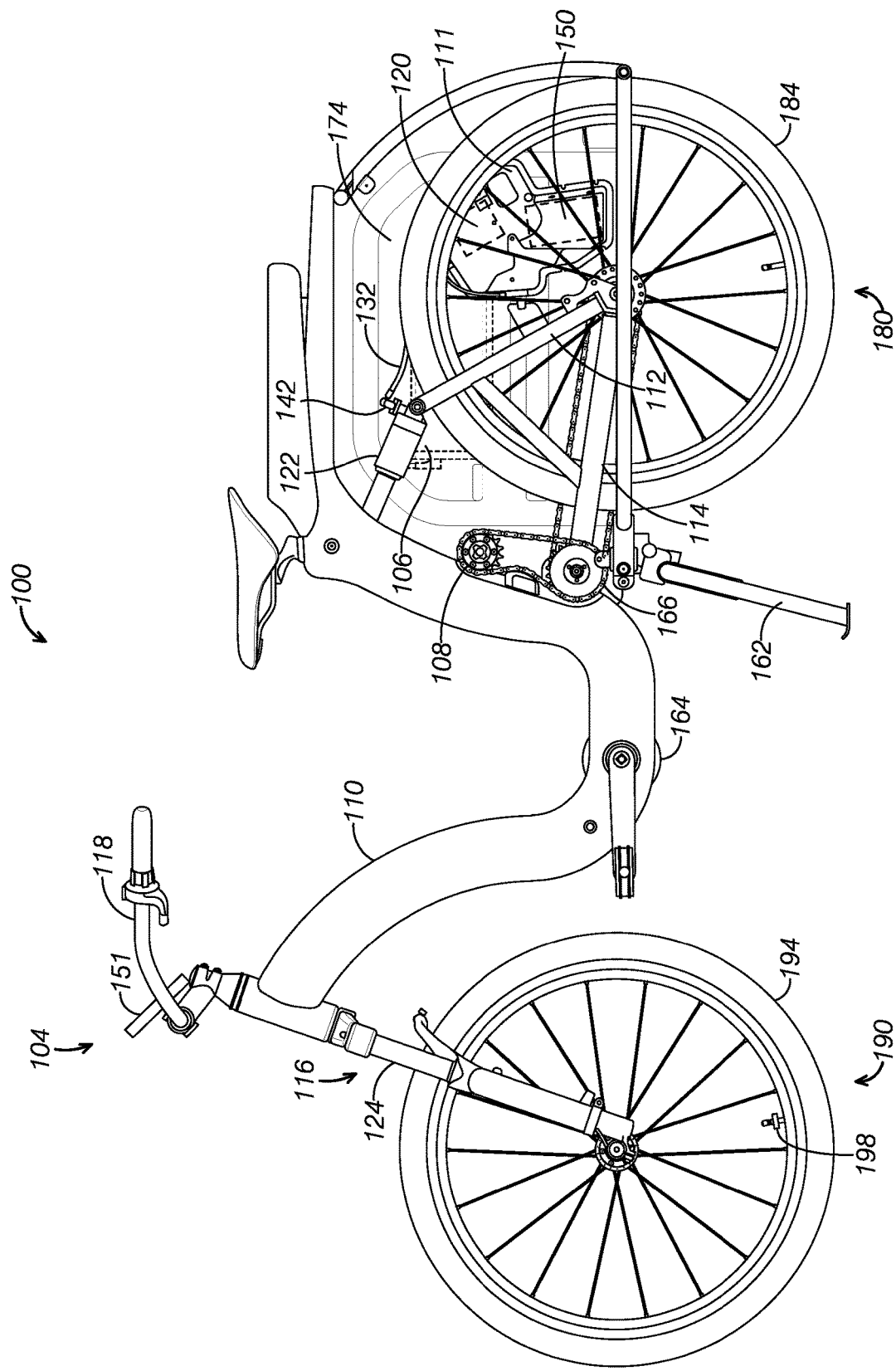
FIG. 1 is a left-side elevational view of an illustrative electric vehicle with an integrated air supply system, in accordance with aspects of the present disclosure.

Various aspects and examples of an integrated air supply system, as well as related methods, are described below and illustrated in the associated drawings. Unless otherwise specified, an integrated air supply system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A and B, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" or "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

Overview

In general, an integrated air supply system of an electric vehicle in accordance with the present teachings may include an air compressor configured to selectively attach to pneumatic components. In some embodiments, the air compressor may be permanently affixed or otherwise incorporated into a bicycle frame, laterally adjacent one of the wheels. In some embodiments, the electric vehicle may further include pneumatic tires and/or a pneumatic suspension system comprising a rear air spring and/or a front pneumatic fork; wherein the pneumatic tires and/or the pneumatic suspension components are selectively coupled to the air compressor. In some examples, the integrated air supply system may further include: one or more sensors configured to measure air pressure within the pneumatic components; and a controller configured to automate maintenance of pneumatic components in response to the measured air pressure within the pneumatic components. In some examples, the integrated air supply system may be installed on an electric bicycle. In some examples, the controller may be configured to receive instructions from a user interface, which may be integrated with the electric vehicle and/or provided on a mobile device and connected to the controller wirelessly.

Examples, Components, and Alternatives

The following sections describe selected aspects of exemplary integrated air supply system as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Electric Bicycle and Integrated Air Supply System

As shown in FIGS. 1-5, this section describes an illustrative electric bicycle having an integrated air supply system, although the air supply system may be incorporated or installed on any suitable wheeled vehicle. The integrated air supply systems described below are examples of an integrated air supply system described in the Overview section, above.

Figure 2:
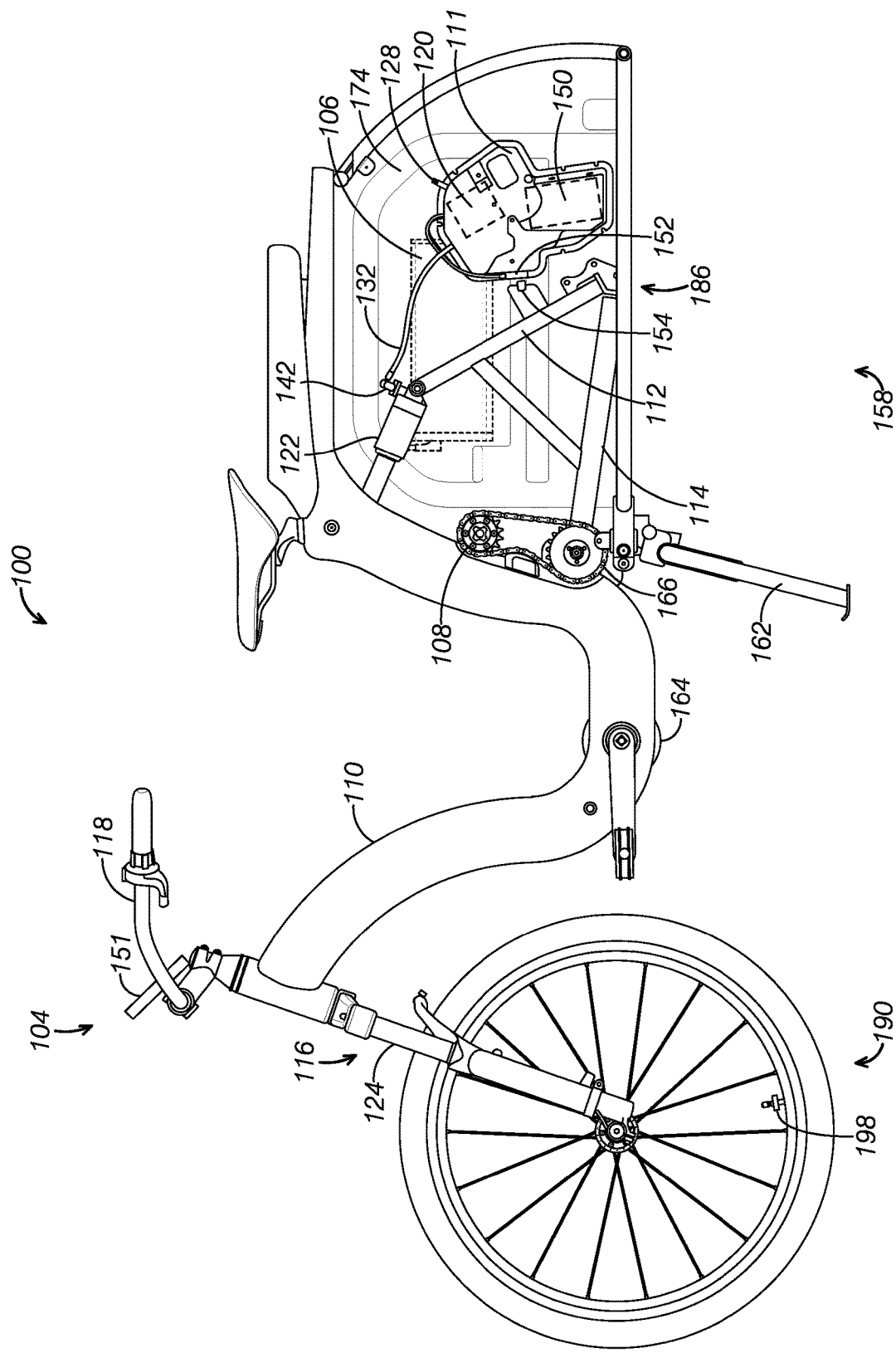
FIG. 2 depicts the electric vehicle of FIG. 1 with its rear wheel removed.
Figure 3:
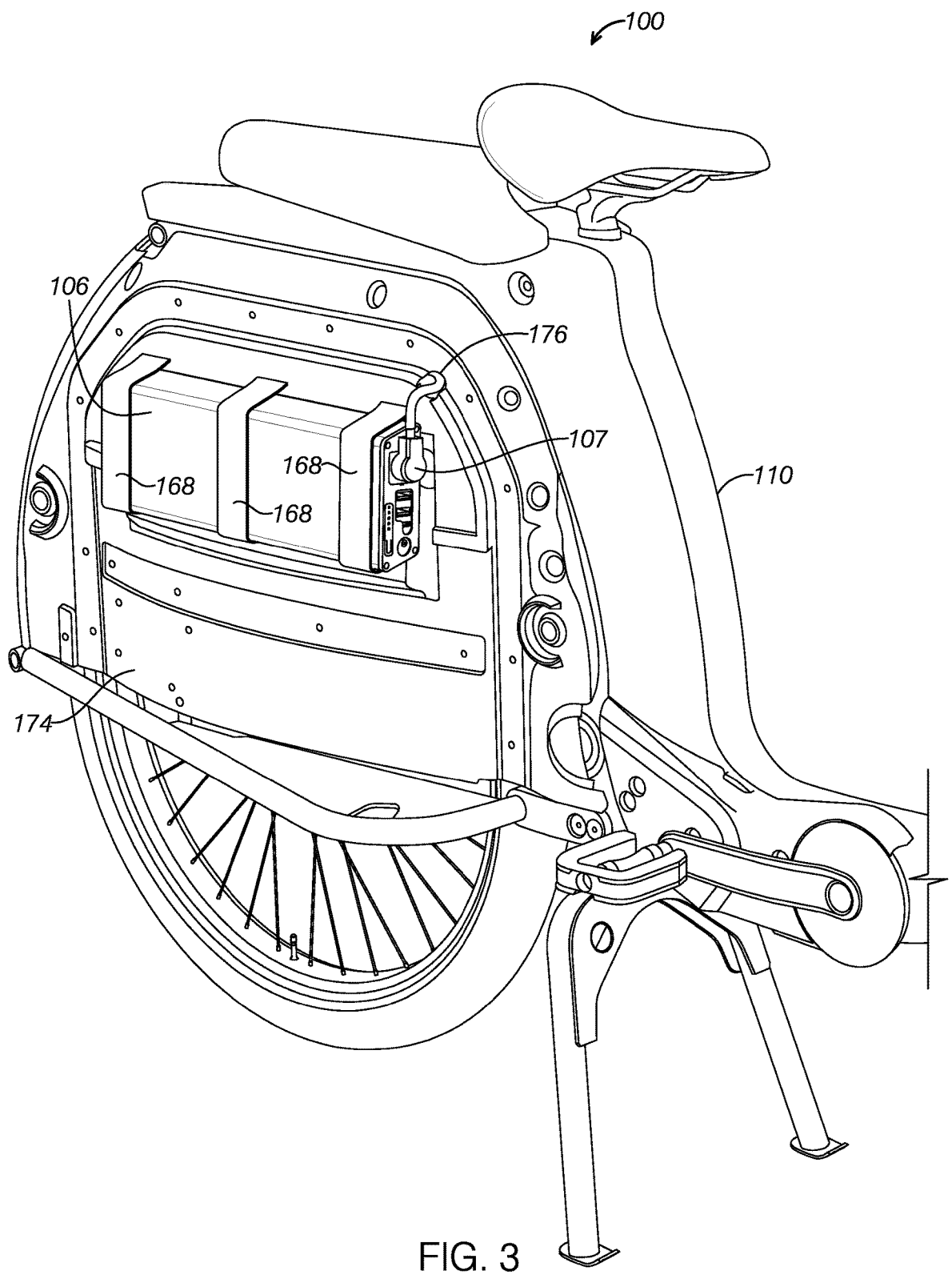
FIG. 3 is a perspective view of a right-side rear end of an illustrative electric vehicle with an outer portion of a rear pannier removed.
Figure 4:
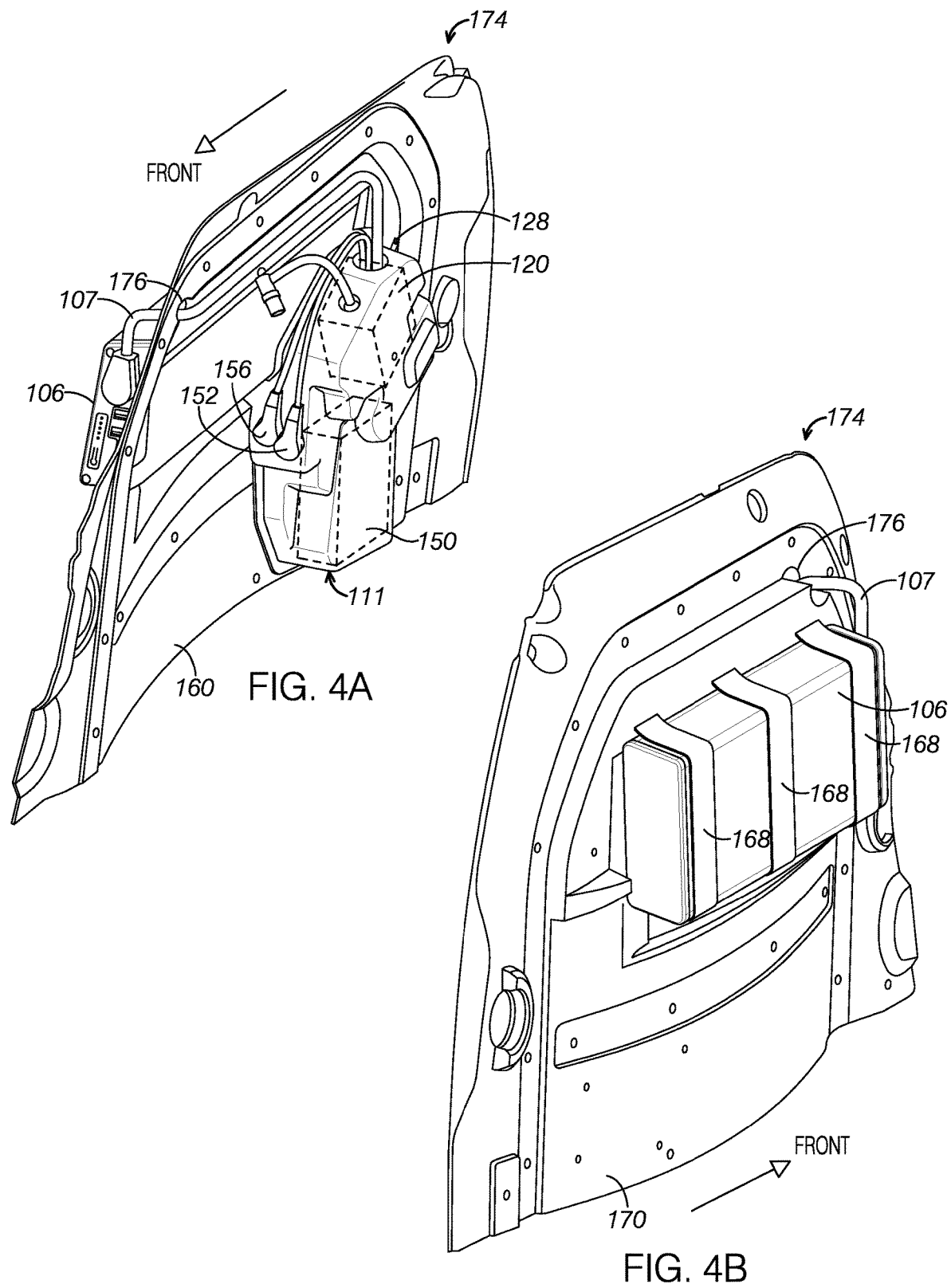
FIG. 4A is a perspective view of an inboard side of an illustrative right-side rear wall of an electric vehicle in which an air compressor and a battery are mounted.
FIG. 4B is a perspective view of an outboard side of the right-side rear wall of FIG. 4A.
Figure 5:
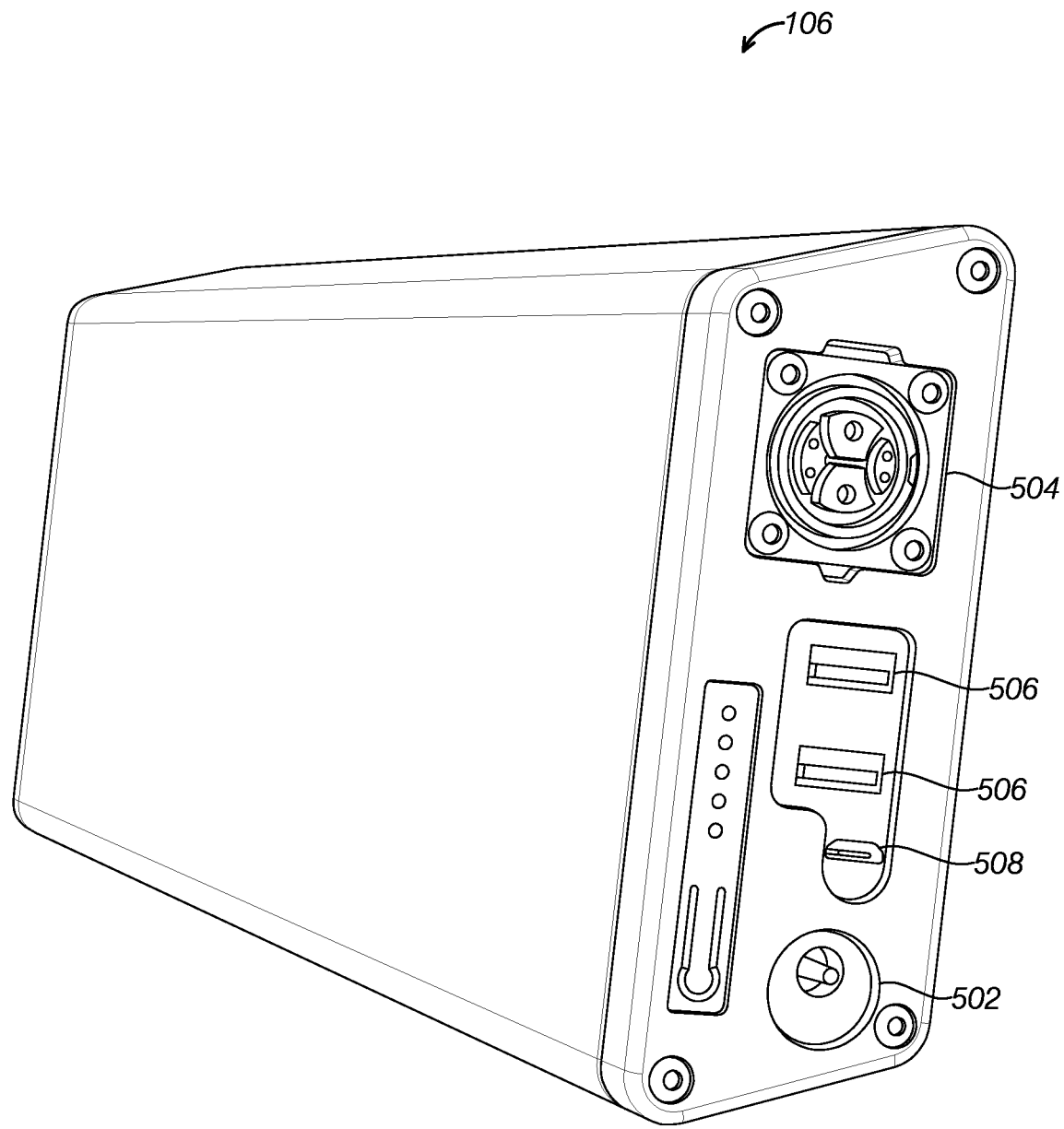
FIG. 5 is a perspective view of an illustrative removable battery of an electric vehicle, in accordance with aspects of the present disclosure.

FIGS. 1 and 2 depict an illustrative electric bicycle 100 having an integrated air supply system comprising a battery 106 and an electric air compressor 120 arranged on a wall 174 attached to a frame 110 of the electric bicycle 100 adjacent a rear wheel 180. FIG. 3 is a perspective view of the right-side rear end of an electric bicycle 100 depicting a rear wall 174 housing a removable battery 106. FIGS. 4A and 4B depict perspective views of an inboard and an outboard side of an illustrative rear wall 174 that has been detached from a right side of a frame of an electric bicycle, wherein a removable battery 106 and an electric air compressor 120 are configured to attach to opposite sides of the rear wall 174. FIG. 5 depicts a removable battery 106 configured to act as a power source of an integrated air supply system of an electric bicycle.

FIGS. 1 and 2 depict electric bicycle 100 comprising an integrated air supply system. In FIGS. 1 and 2, a left side pannier has been removed from the electric bicycle, and wall 174 has been rendered transparent, to show the components of the integrated air supply system. The integrated air supply system includes a battery 106 and an electric air compressor 120 configured to mount onto wall 174 disposed adjacent the rear wheel 180. The battery 106 is mounted on an outbound side of wall 174 and the air compressor is mounted on an inbound side of wall 174 (see FIGS. 4A-4B). The battery is configured to supply power to at least the electric air compressor 120. The air compressor 120 is configured to deliver pressurized air via one or more air lines to pneumatic components of the electric bicycle 100. Pneumatic components may include pneumatic tires 184, 194 and/or components of a suspension system, including, but not limited to, a rear air spring 122 and a front pneumatic fork 124.

In the example depicted in FIGS. 1 and 2, electric bicycle 100 is a two-wheeled vehicle, with a front wheel 190 rotatably coupled to the frame 110 by a front fork assembly 116 including a front pneumatic fork 124 to provide suspension to a front end 104 of the bicycle 100. The front pneumatic fork 124 is steerable by way of a handlebar 118. In this example, a battery 106, an electric air compressor 120, and a controller 150 are attached to the sides of an inner wall 174 of a storage component of the electric bicycle 100 separating an outbound storage area from a rear wheel 180. In some examples, the battery 106 and/or the electric air compressor 120 may be operably connected to, or otherwise affixed to, the frame 110 of the bicycle 100. In yet other examples, the battery 106 and/or the electric air compressor 120 may be selectably or removably securable to other structural elements of the vehicle.

Bicycle 100 further includes a kickstand 162, and a crankset 164 configured to provide manual power to a drive train 166 of the bicycle 100. In this example, crankset 164 is supplementally or intermittently operable in tandem with an electric drive system 108, which includes one or more electric motors. Electric drive system may receive power from battery 106, or from one or more additional batteries (not shown).

With reference to FIG. 2, a rear wheel of the electric bicycle 100 has been removed to provide a better view of the components of the integrated air supply system. In this exemplary embodiment, the electric air compressor 120 includes an air line 132 selectively attached to a valve stem 142 of a rear air spring 122 of a pneumatic suspension system. The rear air spring 122 provides rear suspension for the electric bicycle 100 by being pivotally connected to a frame 110 of the electric bicycle 100 at a first end and pivotally connected to a top end of seat stays 112 of the electric bicycle 100 at a second end.

A rear suspension triangle 158 comprises the rear air spring 122 and the seat stay 112 making a first edge of a triangle, and a chain stay 114 pivotally connected to the frame 110 of the bicycle 100 at a first end of the chain stay making up a second edge of the triangle. The first and second edges of the triangle join at a vertex comprising the rear wheel mounting bracket 186 of the bicycle. A similar rear suspension triangle is formed on each lateral side of the vehicle. The rear suspension triangle 158 thus allows the rear wheel 180 of the electric bicycle to move independently of the frame 110 of the electric bicycle through compression and expansion of the rear air spring.

Further, FIG. 2 depicts an array of sensors including a Hall sensor 152 attached to the forward side of an enclosure 111 (see FIG. 4A) containing the air compressor 120 and a controller 150, and a pressure sensor 198 attached to the front pneumatic tire 194; wherein the sensors are configured to be in communication with the controller 150 of the electric bicycle. The Hall sensor 152 is configured to detect the presence of a magnetic field produced by a magnet 154 attached to the seat stay 112 of the rear suspension triangle 158. The Hall sensor 152 and the magnet 154 are disposed on elements of the electric bicycle 100 that move relative to one another as the rear air spring is compressed. With the bicycle at rest, the Hall sensor 152 and the magnet 154 align at a predetermined amount of suspension supplied by the rear air spring 122 for a predetermined load mass. In some embodiments, the predetermined amount of suspension is adjustable by way of moving the magnet 154 along the seat stay 112, thus requiring a different amount of suspension to achieve alignment of the magnet 154 and the Hall sensor 152.

In some embodiments, Hall sensor 152 may be used to assist in an automated leveling of electric bicycle 100. An amount of rear suspension supplied by the rear air spring 122 is at least a function of load mass and internal pressure within the air spring 122. Thus, when a user of the bicycle alters the load mass, they may choose to alter the amount of rear suspension supplied by the rear air spring 122, for instance to automatically provide an optimal amount of rear suspension and/or to level the rear suspension relative to the front suspension.

More specifically, while the user is seated on the seat of electric bicycle 100, the user may initiate cycling of the rear air spring 122 via an interface. In some embodiments, the interface may be embedded in a control display 151 integrated into the handlebar 118 of the electric bicycle 100. In other embodiments, the interface may be provided on a user device, such as by a smart phone software application. The interface signals the controller 150 to cycle the air pressure in the rear air spring 122. The controller 150 signals a release valve 142 to evacuate the pressurized air of the rear air spring 122. As the air spring 122 loses pressurized air, the frame 110 and the rear suspension triangle 158 move relative to one another, lowering the frame toward the ground and increasing a distance between the Hall sensor 152 and the magnet 154.

A point exists at which the Hall sensor 152 no longer detects the magnetic field of the magnet 154, and at that point the Hall sensor signals the controller 150 to power on the air compressor and begin pumping pressurized air into the rear air spring 122. As the rear air spring 122 receives pressurized air, it begins to inflate, causing the rear suspension triangle 158 to move relative to the frame 110, raising the frame from the ground and decreasing the distance between the Hall sensor 152 and the magnet 154. At a predetermined amount of suspension, for example sufficient to level the bicycle frame or to provide some other desired riding characteristic, the Hall sensor 152 and magnet 154 align in a desired manner or to a desired degree. Upon the Hall sensor 152 sensing sufficient alignment with the magnet 154, the controller signals the air compressor 120 to power off. As a failsafe, the controller 150 may automatically power off the air compressor 120 and, in some embodiments, notify the user of an error after a predetermined amount of time has elapsed without the Hall sensor 152 sensing sufficient alignment with the magnet 154.

As depicted in FIG. 2, the compressor may optionally include an additional outlet valve 128, or other form of compressed air outlet, configured to deliver pressurized air through an additional, selectively attachable air line (not shown). The additional outlet valve 128 is configured to receive a first end of the additional air line, while a second end of the additional air line can be attached to a valve stem of any pneumatic component of the electric bicycle 100, such as a rear pneumatic tire 184 (FIG. 1), a front pneumatic tire 194, additional pneumatic suspension components, and the like. In other words, according to the present teachings, the compressor used to provide compressed air to the rear and/or front air shock may also allow the rider to pump up the tires of the bicycle without the need for an external manual or powered pump.

In some examples, the additional air line may include an internal pressure sensor wherein an air pressure of the air line is measured when the air line engages with a pneumatic component. The internal pressure sensor may be configured to communicate the measured air pressure to the controller 150. In response to the measured air pressure, the controller 150 may signal the air compressor 120 to pump pressurized air to the pneumatic component, for instance if the measured pressure is below a predetermined or user-determined amount. The controller also may signal the air compressor to power off in response to the internal sensor measuring the predetermined or user-determined pressure.

Alternatively, for instance if the measured pressure is higher than a desired maximum, the controller 150 may signal a pressure release valve of the pneumatic component to open so as to decrease the internal pressure of the pneumatic component, typically until the pressure reaches a predetermined maximum, or some other predetermined or user-determined amount. The controller then may signal the release valve to close in response to the internal pressure sensor measuring a desired pressure.

In some embodiments, the electric bicycle 100 may include a user interface embedded in a control display 151 of the electric bicycle 100, the user interface configured to be in communication with the controller 150 and capable of storing user preferences in a memory module. The user may interact with the user interface to set a preferred amount of sag, corresponding to the amount of suspension, for the rear air spring 122 and/or the front pneumatic fork 124. The controller may be further configured to calculate adjustments to the internal air pressure within each of the suspension elements, and to control the supply of air to the suspension elements, to meet the user defined preferred amount of sag in response to changing riding conditions, such as changes in acceleration, changes in the tilt of the vehicle, and/or changes of the effective load mass. Similarly, the user may interact with the user interface to set a preferred amount of pressure in the tires of the vehicle, and the controller may be configured to calculate adjustments and control the supply of air to the tires.

In some embodiments, the electric bicycle 100 may include a user interface embedded in an external computing unit, such as a mobile application on a mobile device, configured to communicate with the controller 150 of the electric bicycle 100 over a wired and/or wireless connection, and to store user preferences in a memory module and/or on a remote server. The user may interact with the external user interface, for example, to set a preferred level of suspension for the rear air spring 122 and/or the front pneumatic fork 124. The mobile application may be further configured to calculate adjustments to the amount of pressurized air within each of the suspension elements to meet the user defined preferred amount of sag in response to changing riding conditions, such as changes in acceleration, changes in the tilt of the vehicle, and/or changes of the effective load mass. Similarly, the user may interact with the external user interface to set a preferred amount of pressure in the tires of the vehicle, and the mobile application may be configured to calculate adjustments and control the supply of air to the tires.

FIG. 3 depicts a right-side perspective view of a rear half of electric bicycle 100 with a right-side pannier removed to show an outbound side of the inner wall 174, in accordance to aspects of the present invention. As in FIGS. 1 and 2, the rear wall 174 is configured to attach to a frame 110 of the bicycle 100 near a rear wheel 180. The rear wall 174 is configured to receive and removably secure battery 106 on the outbound side of the wall 174. In some examples, the battery may be secured to the rear wall 174 via elastic straps 168, although any suitable means of securing the battery 106 may be used, such as other types of straps, brackets, a detachable cover, or the like. An aperture 176 in the rear wall 174 allows the battery 106 to optionally supply power via a power cable 107 to at least electric drive system 108 and/or electric air compressor 120, which in the depicted embodiment are disposed inboard from the rear wall 174.

FIGS. 4A and 4B depict inboard 160 and outboard 170 perspective views of right-side rear wall 174, respectively. The rear wall 174, previously depicted attached to the bicycle frame in FIG. 3, is detached from the frame of the electric bicycle in FIGS. 4A and 4B.

With reference to FIG. 4A, an enclosure 111 is selectively attachable and mounted to an inboard side 160 of rear wall 174 and houses at least the electric air compressor 120. In some examples, enclosure 111 may further house a controller 150, a DC-DC converter (not shown), and/or any other electro-mechanical devices. A plurality of apertures in the enclosure 111 allow passage of cabling, air lines, and an additional outlet valve 128 of the air compressor 120. Power is delivered to the components inside enclosure 111 by a power cable 107 of battery 106 disposed on the outbound side of rear wall 174. Power cable 107 traverses from outboard side 170 to inboard side 160 by way of an aperture 176 in the rear wall 174. In some examples, sensing devices such as a Hall sensor 152, a speed sensor 156, a tensiometer (not shown), or the like, may be mounted on an exterior surface of enclosure 111.

With reference to FIG. 4B, a battery 106 is removably attached to an outboard side 170 of rear wall 174. The outboard side 170 of wall 174 is configured to receive battery 106 in a depression to secure battery 106 to the rear wall 174, and contains at least one aperture to allow the battery 106 to supply power to components disposed on an inboard side 160 of rear wall 174, via power cable 107. In some examples, the battery 106 is attached to the rear wall 174 via elastic straps 168, although any suitable means of securing the battery may be used.

FIG. 5 depicts a perspective view of a battery 106 that may be used in an embodiment of the present teachings, showing further details of the battery. Battery 106 is configured to be removable from an electric vehicle and operably portable, allowing the battery 106 to be charged, or to function as a power source, at an alternate location. More specifically, the removability and portability of battery 106 allows a user of the electric vehicle to re-charge the battery via an AC port 502, at a location that may or may not be accessible to the electric vehicle. Similarly, the user can use battery 106 to power unrelated devices such as a laptop or a mobile phone.

Battery 106 has a main power outlet 504 that delivers power to at least an electric air compressor, in accordance to aspects of the present invention, discussed above. In some examples, battery 106 additionally powers one or more of the following components: a controller, a motor, sensors including but not limited to pressure sensors, signaling lights, headlights, and/or any other element of an electric vehicle that may require a power source. Battery 106 is further configured to act as a portable power supply by including additional power outlet ports. Additional power outlet ports may comprise Universal Serial Bus (USB) ports 506, a micro-USB port 508, and/or any other suitable power delivery port.

B. Illustrative Methods

Figure 6:
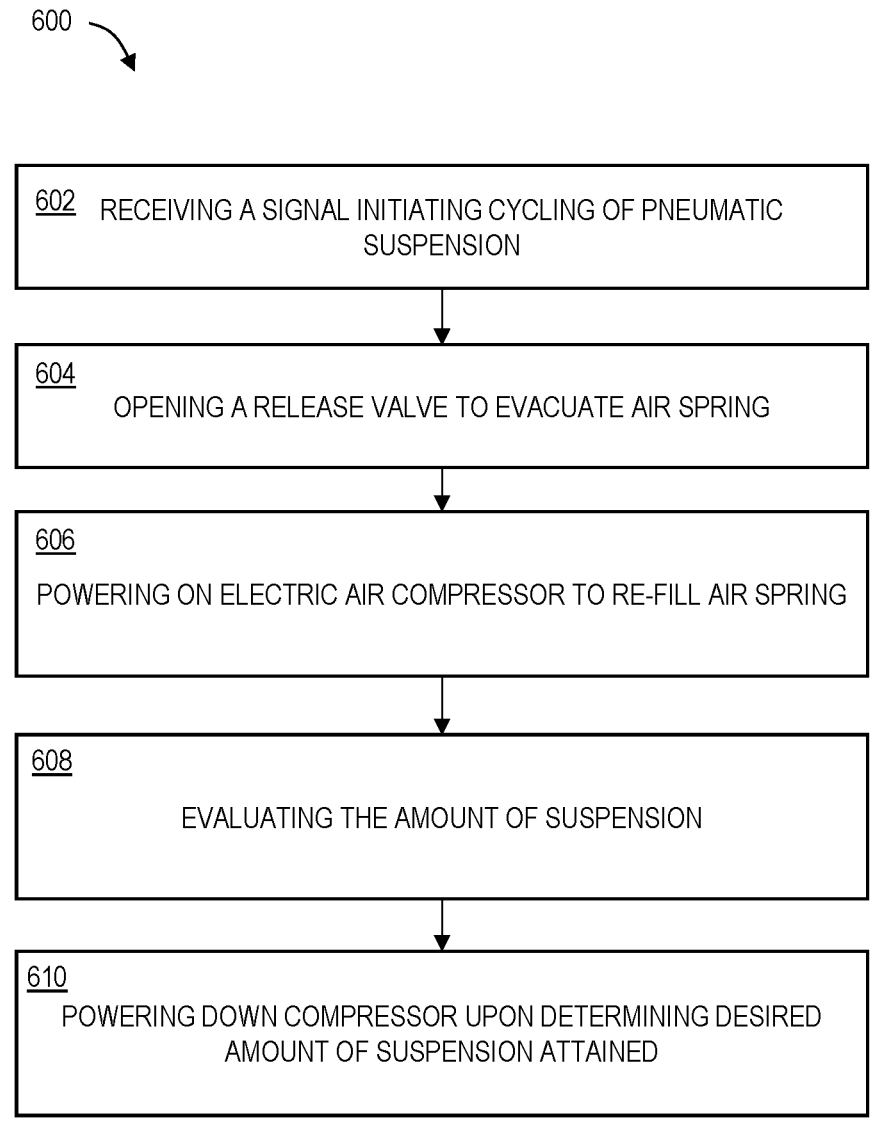
FIG. 6 is a flow chart depicting steps of an illustrative method for automatically cycling pneumatic components of a suspension system, according to aspects of the present teachings.
Figure 7:
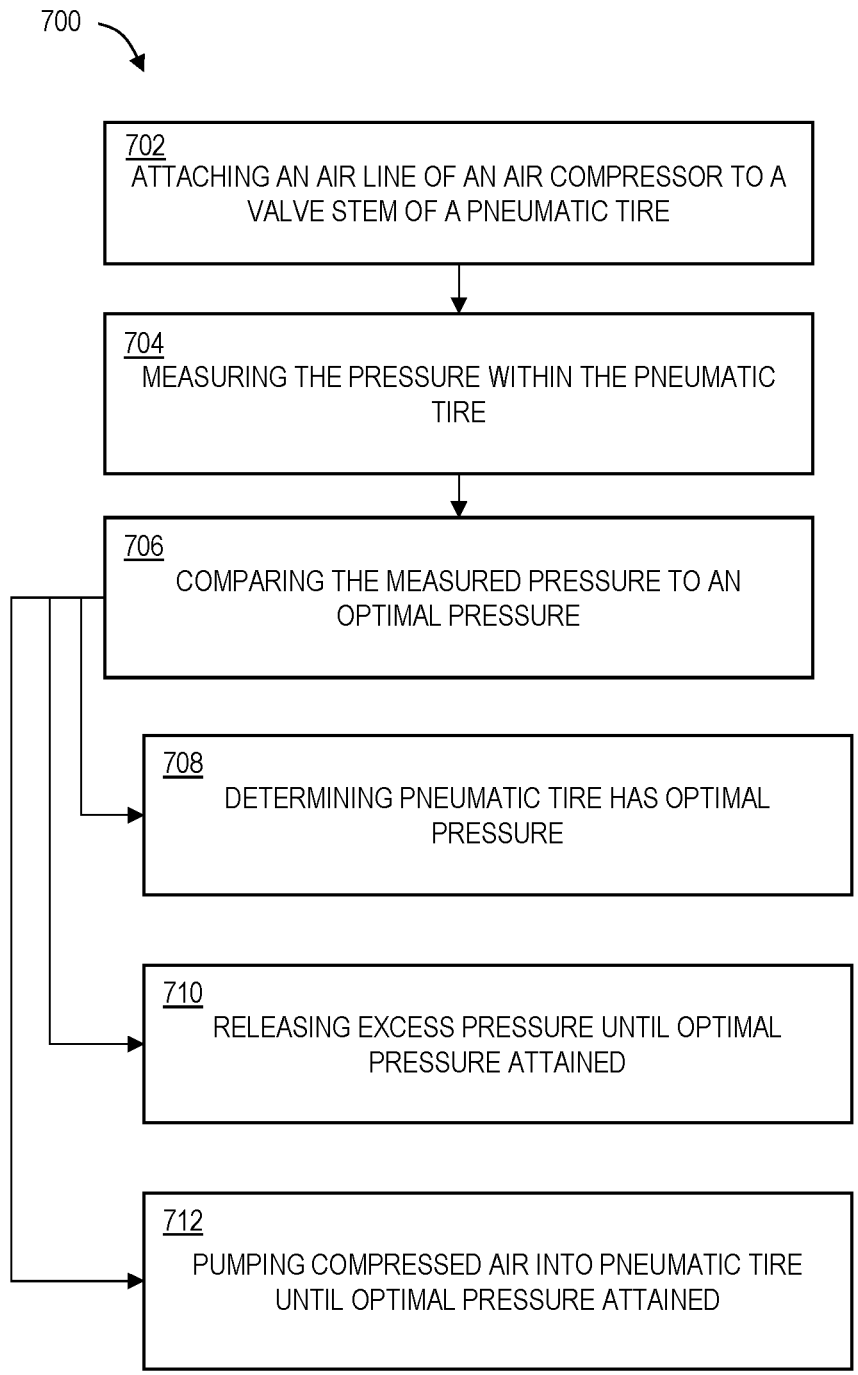
FIG. 7 is a flow chart depicting steps of an illustrative method for automatically maintaining pneumatic tire pressure, according to aspects of the present teachings.
Figure 8:
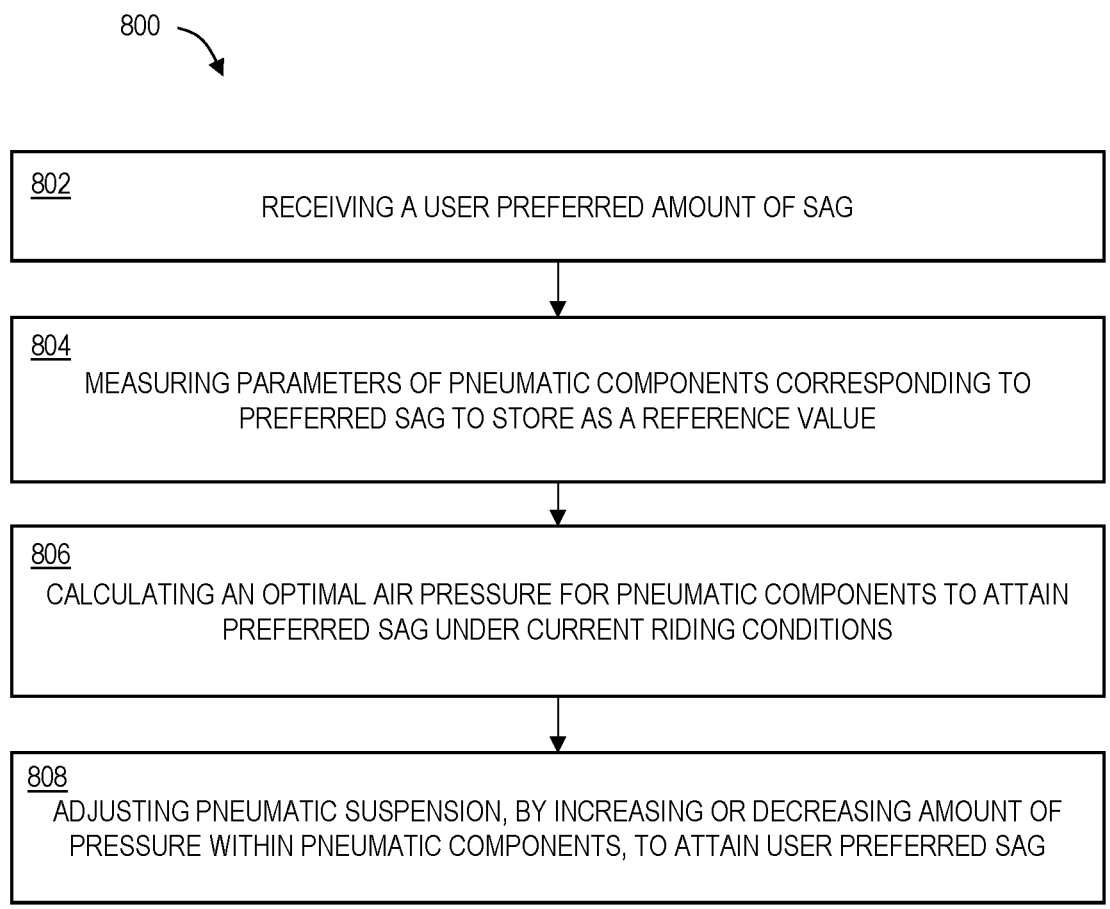
FIG. 8 is a flow chart depicting steps of an illustrative method for automatically maintaining a user defined amount of sag in response to changing cycling conditions, according to aspects of the present teachings.

This section describes steps of illustrative methods an integrated air supply system can perform to maintain pneumatic components of an electric wheeled vehicle (e.g., an electric bicycle); see FIGS. 6-8. Aspects of bicycle 100 and an integrated air supply system, described above, may be utilized in the method steps described below. Where appropriate, reference may be made to components and systems that may be used in carrying out each step. These references are for illustration, and are not intended to limit the possible ways of carrying out any particular step of the method.

FIGS. 6-8 are flowcharts illustrating steps performed in illustrative methods, and may not recite the complete process or all steps of the methods. Although various steps of methods 600, 700, and 800 are described below and depicted in FIGS. 6-8, the steps need not necessarily all be performed, and in some cases may be performed simultaneously or in a different order than the order shown.

FIG. 6 depicts a method 600 for self-leveling a pneumatic suspension of an electric vehicle.

Step 602 of method 600 includes receiving a signal at a controller in response to a user input command that instructs the controller to initiate a cycling of air pressure within a rear suspension component of a pneumatic suspension system. In some examples, the user input command may be provided by a physical button coupled to a control device, whereas in other examples, the user input command may be provided by selecting or otherwise interacting with a digital icon on a graphical user interface, which may be integrated with the electric vehicle or provided on a mobile device via a software application. In some examples, the rear suspension component of a pneumatic suspension system may be a rear air spring.

Step 604 of method 600 includes signaling with the controller to evacuate air within a pneumatic rear suspension component by opening a release valve on the rear suspension component. After a predetermined amount of time, generally sufficient to bring the pressure below some desired minimum value, the release valve closes. In some examples, the release valve may close in response to the air pressure within the suspension component being brought to atmospheric pressure or some other desired value, at which point air stops exiting the suspension. In some cases, a pressure sensor may be used to monitor the pressure in the suspension component, and to provide a signal causing the valve to close when the pressure reaches the desired value.

Step 606 of method 600 includes the controller signaling an electric compressor to power on and begin pumping pressurized air through an air line connecting the air compressor at one end of the air line to a valve or other air inlet of the rear suspension component at a second end of the air line.

The air line may include an internal pressure sensor configured to relay a pressure measurement of the rear suspension component to the controller. In some examples, a pressure sensor may be disposed between the valve of the rear suspension component and the air line of the air compressor, and again may be configured to relay a pressure measurement of the rear suspension component to the controller. In some examples, a pressure measurement of the rear suspension component may be made indirectly, such as by a relative position between a frame of the electric vehicle to a rear suspension triangle of the electric vehicle, for example via a Hall sensor disposed on the frame or rear suspension triangle and a magnet disposed on the rear suspension triangle or the frame, wherein alignment of the magnet with the Hall sensor (which may be adjustable in position) indicates that the pressure has reached a desired level.

Step 608 of method 600 includes evaluating with the controller whether a predetermined amount of pressure within the rear suspension component has been attained, for example based on the measured pressure inside the rear suspension component, or in response to the alignment of the Hall sensor and magnet.

Step 610 of method 600 includes signaling with the controller to power down the air compressor, in response to attaining the predetermined amount of pressure within the rear suspension component. The controller then may signal the user that the rear suspension component has attained the predetermined amount of pressure. In some cases, after a predetermined amount of time without the rear air suspension component attaining the predetermined amount of pressure, the controller may nevertheless signal the air compressor to power down. The controller may additionally signal the user that the rear suspension component did not attain the predetermined amount of pressure. The signal to the user may be a notification on a control device, such as a blinking light, animation, audible warning (such as a series of recognizable tones), and/or the like. The signal may be displayed on an integrated display system or on the user's mobile device, for instance through a dedicated software application.

FIG. 7 depicts a method 700 for automatic tire pressure maintenance.

Step 702 of method 700 includes engaging or coupling a free end of an air line with a pneumatic tire; wherein the opposite end of the air line is coupled to an electric air compressor. In some cases, the air line may be permanently or semi-permanently coupled to the air compressor. In other cases, step 702 many include coupling a first free end of the air line to the tire and coupling a second free end of the air line to an outlet of the air compressor.

Step 704 of method 700 includes measuring the tire air pressure in the pneumatic tire, and reporting the measured air pressure to a controller. In some examples, the pressure within the pneumatic tire is measured via a pressure sensor embedded within the air line. In other examples, the pressure within the pneumatic tire is measured via a pressure sensor attached to a valve stem of the pneumatic tire, or otherwise integrated with the tire. In still other examples, the tire pressure may be measured with a pressure sensor integrated into the compressor, such as with the air outlet used to supply pressurized air to the tires.

Step 706 of method 700 includes comparing with the controller the measured pneumatic tire pressure to a predetermined tire air pressure, which in some cases may be adjustable by the user, for example based on tire type or riding conditions. If the tire pressure is within a tolerance value of the predetermined tire air pressure, then the method proceeds to step 708. If the tire pressure is too high, e.g. the measured air pressure is greater than the predetermined value, the method proceeds to step 710. If the tire pressure is too low, e.g. the measured air pressure is less than the predetermined value, the method proceeds to step 712.

Step 708 of method 700 includes notifying the user that the air pressure within the pneumatic tire is at the desired pressure level. In some examples, the signal to the user may be a notification on a control device, such as a blinking light, animation, audible warning (such as a series of recognizable tones), and/or the like. The signal may be displayed on an integrated display system or on the user's mobile device, for instance through a dedicated software application.

Step 710 of method 700 includes signaling with the controller a release valve of the pneumatic tire to open, to evacuate pressure in response to the measured tire pressure exceeding the predetermined value. The release valve remains open until the controller evaluates that the measured pressure is within the tolerance of the predetermined value, at which point the controller transmits a signal to notify the user that the air pressure within the pneumatic tire is at a desired level. In some examples the signal to the user may be a notification on a control device, such as a blinking light, animation, audible warning (such as a series of recognizable tones), and/or the like. The signal may be displayed on an integrated display system or on the user's mobile device, for instance through a dedicated software application.

Step 712 of method 700 includes signaling with the controller an electric air compressor to power on and begin delivering pressurized air to the pneumatic tire through the air line, in response to the determination that the tire air pressure is below the predetermined value. The air compressor continues to deliver pressurized air until the pressure sensor measures the pressure of air within the pneumatic tire to be within the tolerance level of the predetermined value, and then the compressor powers off. The controller then transmits a signal to notify the user that the air pressure within the pneumatic tire is at a desired level. In some examples, the signal may be a notification on a control device, such as a blinking light, animation, audible warning (such as a series of recognizable tones), and/or the like. The signal may be displayed on an integrated display system or on the user's mobile device, for instance through a dedicated software application.

FIG. 8 depicts a method 800 for setting a preferred amount of sag and automated adjustment of a pneumatic suspension system of an electric vehicle to maintain the amount of sag while the vehicle is in motion.

Step 802 of method 800 includes allowing a user of the electric vehicle to define a preferred amount of sag in the pneumatic suspension of the vehicle, including the front and/or rear suspension. In some examples, this may include the user adjusting an amount of pressure in the pneumatic suspension components manually or with aid of an integrated air supply system, in accordance with aspects of the present disclosure. In some examples, the user may define the preferred amount sag via an onboard user interface, i.e., a display screen or other accessory integrated with the electric vehicle. In some examples, the onboard user interface may comprise buttons and/or switches on a control device. In other examples, the user may define the preferred amount of sag via a connected device such as a mobile phone, tablet, and/or computer capable of interfacing with a controller of the electric vehicle via a wired and/or wireless connection, using a user interface running a software application. In some examples, a default preferred amount of suspension sag may be predefined, such as the amount of sag that results in a level vehicle frame.

Step 804 of method 800 includes measuring and storing to memory an amount of air pressure within the pneumatic suspension components with one or more pressure sensors, e.g. a front suspension sensor and/or a rear suspension sensor.

Step 806 of method 800 includes determining with a controller optimal values for pressure within the pneumatic suspension component(s) as a function of acceleration, tilt, and/or incline of the vehicle that would simulate the preferred amount of sag; and determining whether the measured air pressure in the one or more pneumatic suspension components are equal to, greater than, or less than the optimal values determined by the controller.

Step 808 of method 800 includes automatically adjusting the amount of air pressure within the one or more pneumatic suspension components in response to a deviation between the measured and optimal pressure values. Specifically, if the measured air pressure in a pneumatic suspension component is less than the corresponding optimal value determined by the controller, the controller signals an electric air compressor to deliver pressurized air to the pneumatic suspension component. The air compressor continues to deliver pressurized air until the pressure sensor measures the pressure of air within the pneumatic suspension component to be within a tolerance level of the controller derived optimal value.

On the other hand, if the measured air pressure in a pneumatic suspension component exceeds the optimal value determined by the controller, the controller signals a release valve on the pneumatic component to open, causing the pneumatic component to release excess air. The release valve remains open until the pressure sensor measures the air pressure within the pneumatic suspension component to be within the tolerance level of the controller determined optimal value. Thus, by automatically attaining pressure in one or more suspension components, a desired amount of suspension sag is automatically provided to the vehicle.

Advantages, Features, and Benefits

The different embodiments and examples of an electric vehicle having an integrated air supply system described herein provide several advantages over known solutions for maintaining pneumatic components (e.g. pneumatic tires and pneumatic suspension) of an electric vehicle. For example, illustrative embodiments and examples described herein allow automatic leveling of the electric vehicle in response to a change in load mass by way of an integrated air supply system comprising an electric compressor attached to a pneumatic suspension system.

Additionally, and among other benefits, illustrative embodiments and examples described herein allow a user of the bicycle to automatically adjust the pressure within pneumatic tires by engaging a dedicated air line from an electric compressor of an integrated air supply system.

Additionally, and among other benefits, illustrative embodiments and examples described herein allow a user to define a preferred amount of sag in suspension and a vehicle automatically adjusts pressure levels in pneumatic suspension components to maintain the preferred amount of sag by way of an integrated air supply system comprising an electric compressor attached to a pneumatic suspension system, using a controller to determine the pressure in each pneumatic suspension component corresponding to the desired amount of sag.

Additionally, and among other benefits, illustrative embodiments and examples described herein allow a removable battery as a power supply for the electric vehicle. The utility and function of which allow the power supply to be charged in locations that may not be suitable for the electric vehicle, such as within an urban dwelling unit. Additional features of the power supply include the inclusion of standardized ports allowing additional power output ports allowing the battery to act as an external power supply capable of providing power in situations in which electricity may not be convenient and/or available.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. An electric bicycle, comprising:
a bicycle frame;
a front wheel and a rear wheel;
an electric motor configured to drive rotation of at least one of the wheels;
an air spring configured to provide adjustable suspension of the bicycle frame relative to at least one of the wheels;
an electric air compressor operatively attached to the bicycle frame;
an air line connecting the air compressor to the air spring and configured to provide pressurized air to the air spring; and
a battery configured to provide electrical energy to the motor and the air compressor.

2. The electric bicycle of claim 1, further comprising a suspension sensor configured to measure an amount of suspension of the bicycle frame relative to at least one of the wheels, and a controller configured to cause the air compressor to provide pressurized air to the air spring through the air line if a predetermined condition is measured by the sensor.

3. The electric bicycle of claim 2, wherein the predetermined condition is an amount of suspension less than a desired value.

4. The electric bicycle of claim 3, wherein the controller is configured to cause the air spring to release pressurized air if the amount of suspension is greater than the desired value.

5. The electric bicycle of claim 2, wherein the controller is configured to depressurize the air spring and then to cause the air compressor to provide pressurized air until the suspension sensor measures an amount of suspension equal to a predetermined amount.

6. The electric bicycle of claim 1, wherein the battery is removable from the electric vehicle and is configured to act as a portable power supply for a mobile device.

7. The electric bicycle of claim 1, wherein the battery includes a USB power outlet port configured to supply power to a mobile device.

8. The electric bicycle of claim 1, wherein the air spring is a rear suspension component, and further comprising a controller configured (a) to cause a release valve on the rear suspension component to open and thereby to evacuate air from the rear suspension component, (b) after air is evacuated from the rear suspension component and after the release valve is closed, to signal the air compressor to power on and begin pumping pressurized air to the rear suspension component through the air line, and (c) to signal the air compressor to power down the air compressor in response to attaining a predetermined amount of pressure within the rear suspension component.

9. An electric vehicle, comprising:
a frame;
a front wheel and a rear wheel;
an electric motor configured to drive rotation of one of the wheels;
a rear air spring operatively attached to both the frame and the rear wheel;
an electric air compressor operatively attached to the frame;
a first air line connecting the air compressor to the rear air spring and configured to carry pressurized air from the air compressor to the rear air spring, and thereby to provide suspension of the frame relative to the rear wheel; and
a battery configured to provide electrical energy to both the electric motor and the air compressor.

10. The electric vehicle of claim 9, further comprising a rear suspension sensor configured to measure an amount of suspension of the frame relative to the rear wheel, and a controller configured to cause the air compressor to provide pressurized air to the rear air spring through the first air line if the rear suspension sensor measures an amount of suspension less than a desired value.

11. The electric vehicle of claim 10, wherein the controller is configured to depressurize the air spring and then to cause the air compressor to provide pressurized air until the suspension sensor measures an amount of suspension equal to a predetermined amount.

12. The electric vehicle of claim 11, wherein the controller is configured to depressurize the air spring in response to a wireless signal received from a mobile device running a software application.

13. The electric vehicle of claim 10, wherein the battery includes a power outlet port configured to provide power to a mobile device.

14. The electric vehicle of claim 13, wherein the battery is configured to be removable from the electric vehicle and to operate as a power source for the mobile device at a location distal from the electric vehicle.

15. The electric vehicle of claim 14, wherein the battery is configured to be charged via an AC port at a location that is not accessible to the electric vehicle.

16. An electric vehicle, comprising:
a wheel attached to a frame;
an air spring configured to provide an adjustable amount of suspension of the frame relative to the wheel;
an electric motor configured to drive rotation of the wheel;
an electric compressor configured to produce pressurized air;
a battery configured to provide electrical energy to the motor and the compressor; and
an air line configured to carry pressurized air from the compressor to the air spring.

17. The electric vehicle of claim 16, further comprising a suspension sensor configured to measure an amount of suspension of the frame relative to the wheel, and a controller configured to cause the compressor to provide pressurized air to the air spring through the air line if the suspension sensor measures an amount of suspension less than a desired value.

18. The electric vehicle of claim 17, wherein the battery includes at least one power outlet port configured to provide power to a mobile device.

19. The electric vehicle of claim 17, wherein the controller is configured to depressurize the air spring and then to cause the pump to provide pressurized air until the suspension sensor measures an amount of suspension equal to a predetermined amount.

20. The electric vehicle of claim 19, wherein the controller is configured to depressurize the air spring in response to a wireless signal received from a mobile phone.

* * * * *